United States Patent [19]

Suzuki et al.

[11] Patent Number: 5,297,859
[45] Date of Patent: Mar. 29, 1994

[54] METHOD OF CORRECTING TARGET SLIP RATIOS WITH A CORRECTION COEFFICIENT BASED ON VEHICLE DECELERATION

[75] Inventors: Osamu Suzuki; Atsuo Ota, both of Wako, Japan

[73] Assignee: Honda Giken Kogyo Kabushiki Kaisha, Tokyo, Japan

[21] Appl. No.: 957,906

[22] Filed: Oct. 8, 1992

[30] Foreign Application Priority Data

Oct. 14, 1991 [JP] Japan ................................. 3-264992

[51] Int. Cl.$^5$ ................................................ B60L 7/00
[52] U.S. Cl. ..................................... 303/102; 303/100
[58] Field of Search .................. 303/91, 93, 100, 102, 303/103, 105, 107, 108; 364/426.02

[56] References Cited

U.S. PATENT DOCUMENTS

| | | | |
|---|---|---|---|
| 4,811,993 | 3/1989 | Matsumoto et al. | 303/100 |
| 5,005,916 | 4/1991 | Fujioka et al. | 303/100 X |
| 5,072,393 | 12/1991 | Mori et al. | 303/100 X |

*Primary Examiner*—Andres Kashnikow
*Assistant Examiner*—Josie A. Ballato

[57] ABSTRACT

A method of and a system for controlling brakes. A target slip ratio of each of wheels at the start of antilock control is estimated and a vehicle deceleration prior to the start of the anti-lock control is detected. The target slip ratio at the start of the antilock control is corrected based on the detected vehicle deceleration. Thus, vehicle controllability correlated to the vehicle deceleration can be prevented from being impaired. It is therefore possible to reliably improve the control performance of a vehicle and to effect the optimum brake control.

4 Claims, 6 Drawing Sheets

METHOD OF CORRECTING TARGET SLIP RATIOS WITH A CORRECTION COEFFICIENT BASED ON VEHICLE DECELERATION

BACKGROUND OF THE INVENTION

1. Field of the Invention

The present invention relates to a method of and a system for controlling brakes wherein a target slip ratio of each wheel can be estimated based on a vehicle deceleration prior to the start of antilock control.

2. Description of the Related Art

An antilock control system is known which is suitable for use in a motorcycle, i.e., a 2-wheeled automotive vehicle, for example. In the antilock control system, an antilocking modulator is disposed between a master cylinder for converting a brake operating instruction issued by actuating a lever and a pedal by a driver into desired hydraulic pressure and a caliper cylinder for causing brake disks of wheels to generate braking forces. A control circuit is supplied with signals indicative of front- and rear-wheel speeds. Further, a caliper pressure control signal is outputted to the modulator so as to brake each wheel, based on a computed slip ratio or both an acceleration and a deceleration of each wheel or the like.

In this case, the antilock control is started when the computed slip ratio is more than or equal to a set slip ratio. The set slip ratio normally varies depending on a vehicle speed or velocity.

Now, it is known that controllability of the vehicle is related to a ground load sharing proportion or ratio of each of the front and rear wheels and the ground load sharing ratio is correlated to a vehicle deceleration. Though it is apparent that correlation exists between the vehicle controllability and the vehicle deceleration in this way, conventional antilock control has been carried out irrespectively of the vehicle deceleration. Thus, the vehicle controllability is subject to change depending on the vehicle deceleration at the start of the antilock control.

SUMMARY OF THE INVENTION

It is a principal object of the present invention to provide a method of and a system for controlling brakes wherein vehicle controllability at the start of antilock control can be reliably improved, any burden imposed on a driver can be lightened and the optimum brake control can be effected.

It is another object of the present invention to provide a method of controlling brakes, comprising steps of estimating target slip ratios of wheels at the start of antilock control, detecting a vehicle deceleration prior to the start of the antilock control, and correcting the target slip ratios at the start of the antilock control based on the detected vehicle deceleration.

It is a further object of the present invention to provide a method of controlling brakes wherein a correction coefficient reduced in inverse proportion to an increase in the detected vehicle deceleration is set and the target slip ratios at the start of the antilock control are corrected based on the set correction coefficient.

It is a still further object of the present invention to provide a method of controlling brakes wherein a determination is made as to whether or not the antilock control has been carried out after the target slip ratios have been estimated and if the answer is determined to be No, then the vehicle deceleration prior to the start of the antilock control is detected.

It is a still further object of the present invention to provide a system for controlling brakes, comprising a vehicle speed computing circuit for computing a vehicle running speed from a rotational speed of each of wheels, a slip ratio computing circuit for computing a target slip ratio of each wheel from the vehicle running speed and the wheel rotational speed, a vehicle deceleration computing circuit for computing a vehicle deceleration from the vehicle running speed, and an arithmetic processing circuit for determining a coefficient for correcting the target slip ratio, based on the computed vehicle deceleration and for correcting the target slip ratio based on the determined correction coefficient.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 2:
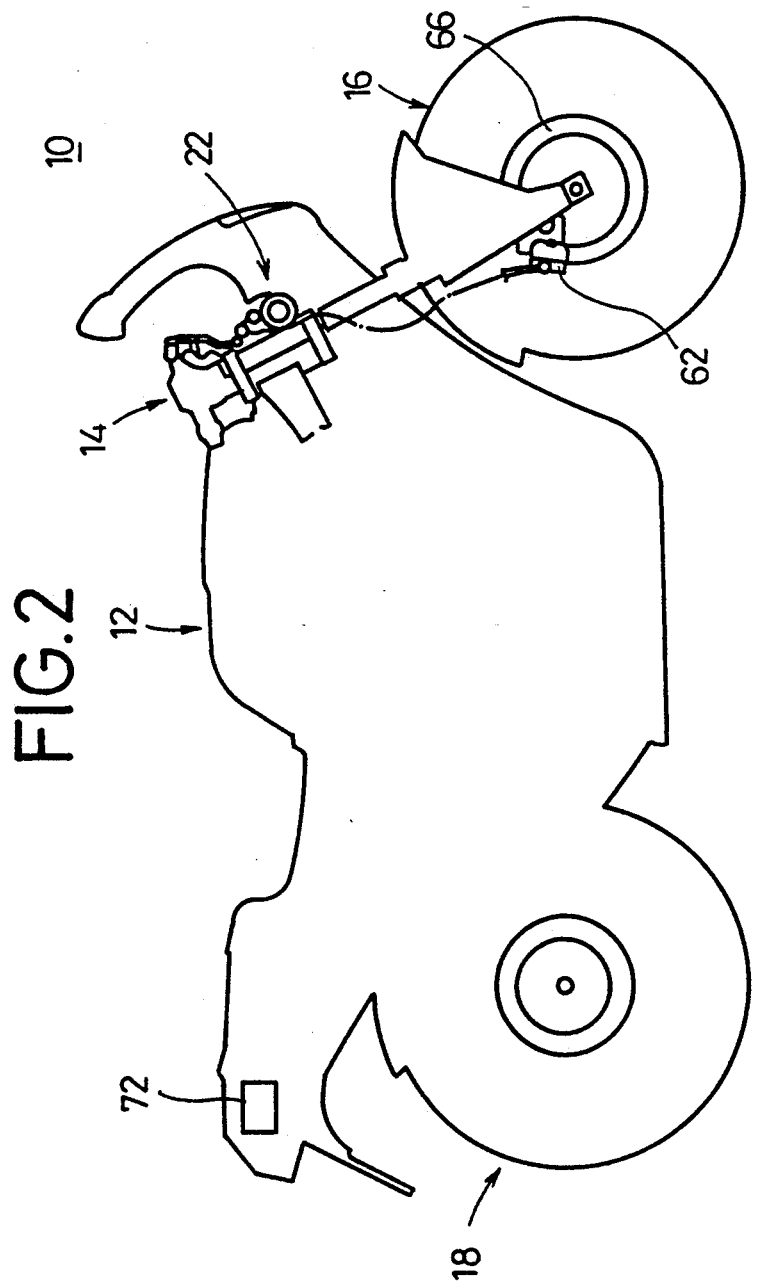
FIG. 2 is a schematic side view illustrating a motorcycle on which the brake control system shown in FIG. 1 has been mounted.

In FIG. 2, reference numeral 10 indicates a motorcycle, i.e., a 2-wheeled motorized vehicle. The motorcycle 10 comprises a main body 12, a handle 14, a front wheel 16 and a rear wheel 18.

Figure 1:
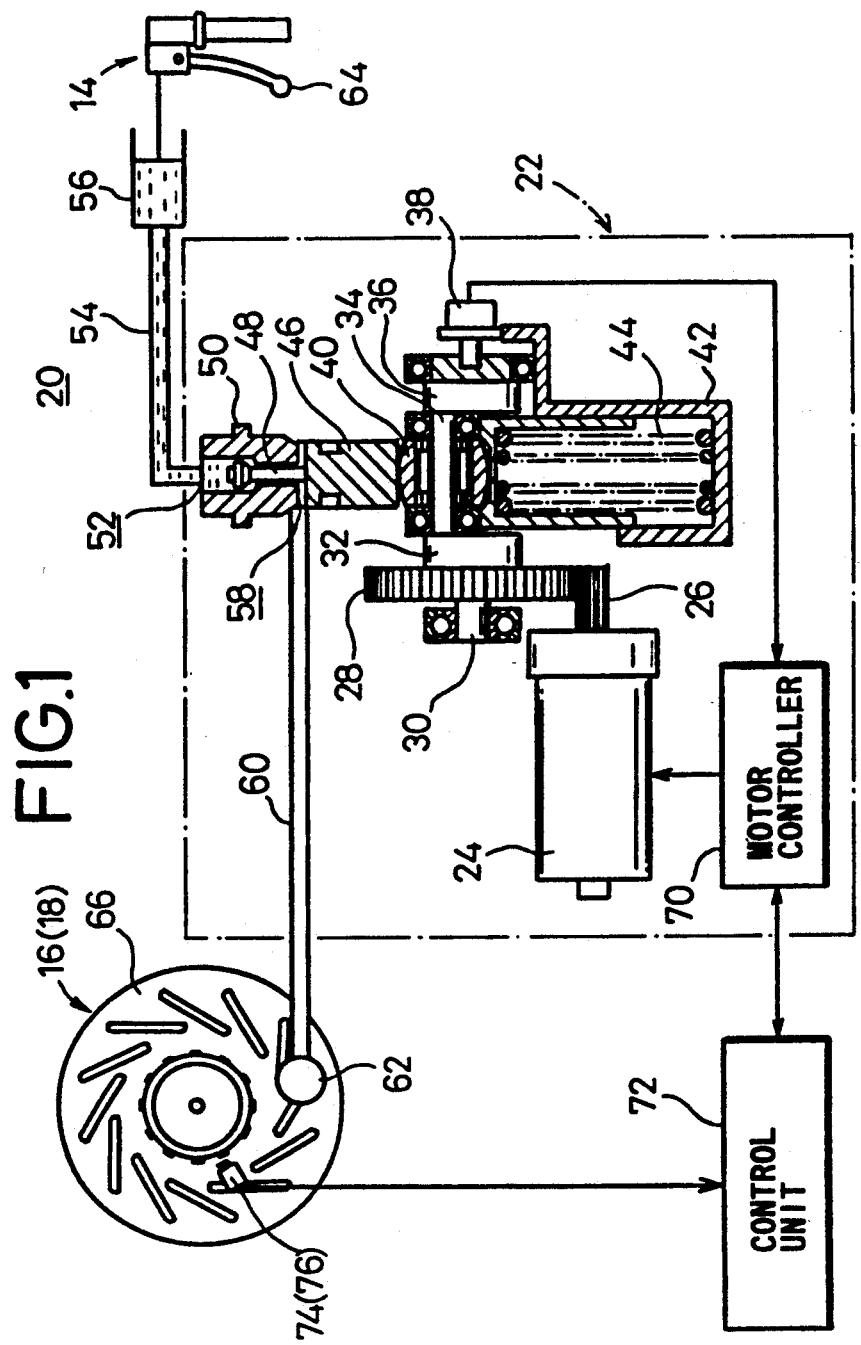
FIG. 1 is a schematic view showing a brake control system for effecting a brake control method according to the present invention.

A brake control system 20 for carrying out a method of controlling brakes, according to one embodiment of the present invention is disposed in the motorcycle 10. As shown in FIG. 1, the brake control system 20 is provided with an antilocking modulator 22. A pinion 26 is rotatably mounted to a d.c. motor 24 of the modulator 22 and maintained in meshing engagement with a gear 28. The gear 28 is supported by a crank shaft 30 to which one end of a crank pin 34 is eccentrically coupled via a crank arm 32. A potentiometer 38 for detecting the position of an expander piston (which will be described later) is attached to the other end of the crank pin 34 via a crank arm 36.

A cam bearing 40 is rotatably mounted on the crank pin 34. The lower end of the cam bearing 40 is always pressed toward an upper limit position under the action of return springs 44 accommodated in a spring holder 42. The expander piston 46 is brought into abutment against the upper end of the cam bearing 40 and displaced in upward and downward directions in response to an up-and-down movement of the cam bearing 40 so as to open and close a cut valve 48.

A cut valve holder 50 having the cut valve 48 incorporated therein is provided above the expander piston 46. A master cylinder 56 is connected via a passage 54 to an input port 52 of the cut valve holder 50. On the other hand, a wheel braking caliper cylinder 62 is connected via a passage 60 to an output port 58 of the cut valve holder 50. The master cylinder 56 and the caliper cylinder 62 are interconnected with each other via the passage 54, the modulator 22 and the passage 60. This path is filled with oil for the hydraulic pressure. The master cylinder 56 is actuated to adjust the hydraulic pressure under the action of a brake lever 64 so as to cause the cut valve 48 to actuate the caliper cylinder 62, thereby applying a braking force to a disk plate 66 disposed in each of the front wheel 16 and the rear wheel 18.

A motor controller 70 is electrically connected to the potentiometer 38 and the d.c. motor 24. The motor controller 70 is electrically connected to a control unit 72. Wheel speed or velocity sensors 74, 76 are connected to the control unit 72 for detecting the speed of the front wheel 16 and that of the rear wheel 18 respectively.

Figure 3:
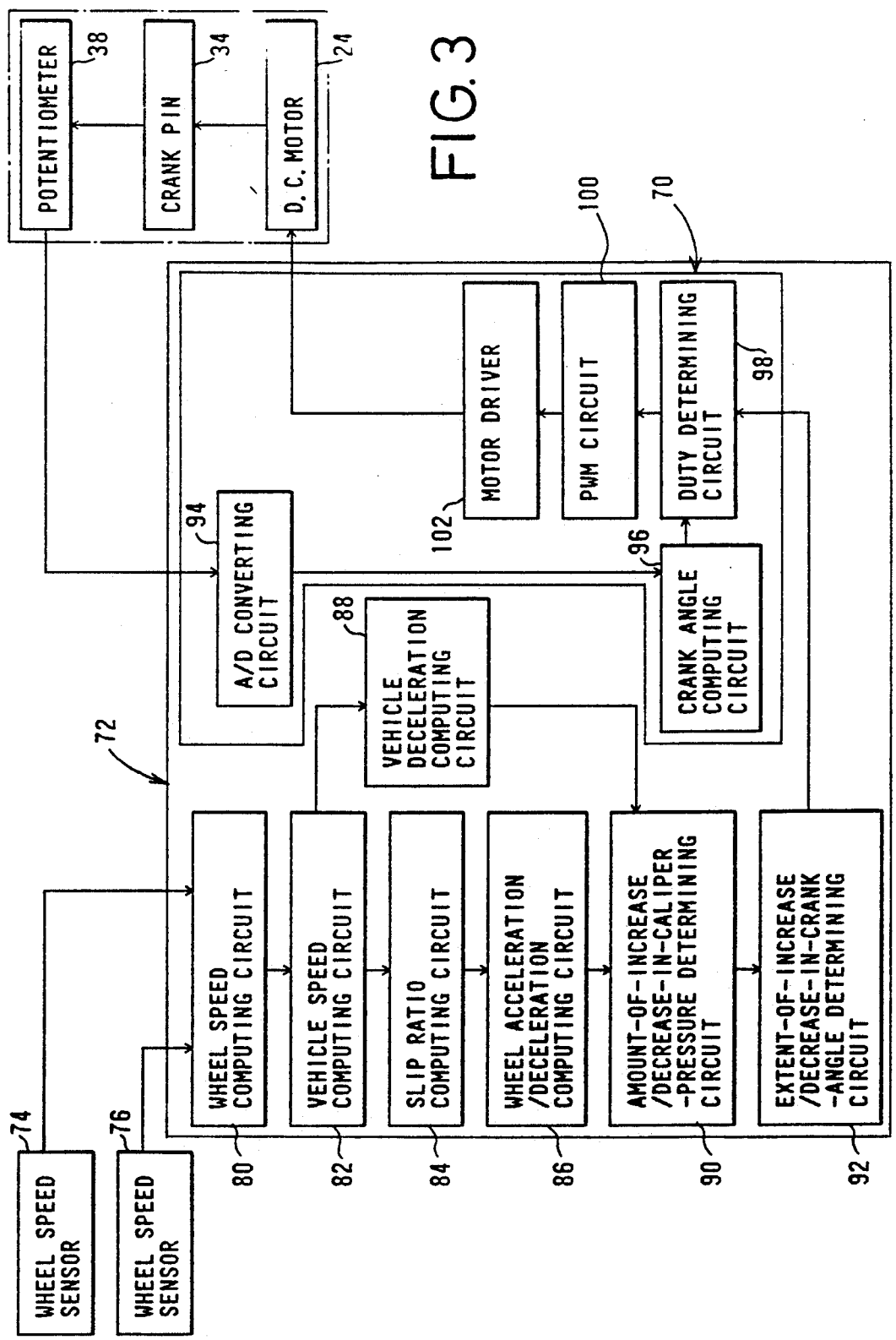
FIG. 3 is a block diagram depicting a control unit and a motor controller of the brake control system shown in FIG. 1.

FIG. 3 is a block diagram illustrating the arrangement for control of each of the control unit 72 and the motor controller 70.

The control unit 72 comprises a wheel speed computing circuit 80 for computing the rotational speed or velocity of each wheel based on each of values outputted from the wheel velocity sensor 74 attached to the front wheel 16 and the wheel velocity sensor 76 attached to the rear wheel 18, a vehicle speed computing circuit 82 for computing and estimating a vehicle running speed or velocity from the computed rotational speed of each wheel, a slip ratio computing circuit 84 for computing a target slip ratio of each wheel based on the vehicle running speed and the rotational speed of each wheel, a wheel acceleration/deceleration computing circuit 86 for computing, based on the computed target slip ratio, both an acceleration and a deceleration of each of the front and rear wheels 16, 18, for controlling the motorcycle 10, a vehicle deceleration computing circuit 88 for computing a vehicle deceleration from the vehicle running speed, an amount-of-increase/decrease-in-caliper-pressure determining circuit 90 for determining, based on the computed vehicle deceleration and the vehicle running speed, the amount of increase or decrease in caliper pressure applied to the caliper cylinder 62, and an extent-of-increase/decrease-in-crank-angle determining circuit 92 for determining, as a crank angle, a displacement required to angularly and positionally elevate or lower the crank pin 34 of the modulator 22 on the basis of the amount of increase or decrease in the caliper pressure. The control unit 72 determines a factor or coefficient for correcting a target slip ratio, based on the vehicle deceleration and also has a function serving as an arithmetic processing circuit for correcting the target slip ratio based on the determined correction coefficient.

The motor controller 70 comprises an A/D converting circuit 94 for converting the output of the potentiometer 38 for detecting information about the position of the crank pin 34 of the modulator 22 into a digital value, a crank angle computing circuit 96 for computing information indicative of a crank's control position, a so-called control crank angle from the information about the position of the crank pin 34, a duty determining circuit 98 for deciding the duty of a pulse, a PWM circuit 100 for generating a train of pulses based on the duty determined by the duty determining circuit 98, and a motor driver 102 for energizing the d.c. motor 24 in response to the train of pulses.

The operation of the brake control system 20 constructed as described above will now be described in connection with the brake control method according to the present embodiment.

Upon normal braking, the crank pin 34 is maintained at a predetermined upper limit position by resilient forces of the return springs 44 so as to cause the cam bearing 40 mounted on the crank pin 34 to hold the expander piston 46 in a forced-up state. As a result, the cut valve 48 is forced up by the expander piston 46 to thereby enable the input port 52 to communicate with the output port 58.

When the brake lever 64 is then gripped, the master cylinder 56 is actuated to transmit brake hydraulic pressure generated by the master cylinder 56 to the caliper cylinder 62 through the passage 54, the input port 52, the output port 58 and the passage 60 in that order, thereby applying a braking force to the disk plate 66.

On the other hand, the wheel speed computing circuit 80 of the control unit 72 computes a wheel rotational speed based on information indicative of the rotational speed of each of the front and rear wheels 16, 18, which has been detected by each of the wheel velocity sensors 74, 76. The vehicle speed computing circuit 82 is then activated to estimate a vehicle running speed from the information about the computed wheel rotational speed.

The slip ratio computing circuit 84 computes a wheel target slip ratio based on the vehicle running speed and the rotational speed of each of the front and rear wheels 16, 18. Then, the wheel acceleration/deceleration computing circuit 86 inputted with the result of computation by the slip ratio computing circuit 84 determines both an acceleration and a deceleration of each wheel. Further, the vehicle deceleration computing circuit 88 computes a vehicle deceleration based on the vehicle running speed. The amount-of-increase/decrease-in-caliper-pressure determining circuit 90 corrects the computed target slip ratio based on the computed vehicle deceleration and the vehicle acceleration and deceleration or the like to thereby determine the amount of increase or decrease in the caliper pressure to be applied to the caliper cylinder 62.

Figure 4:
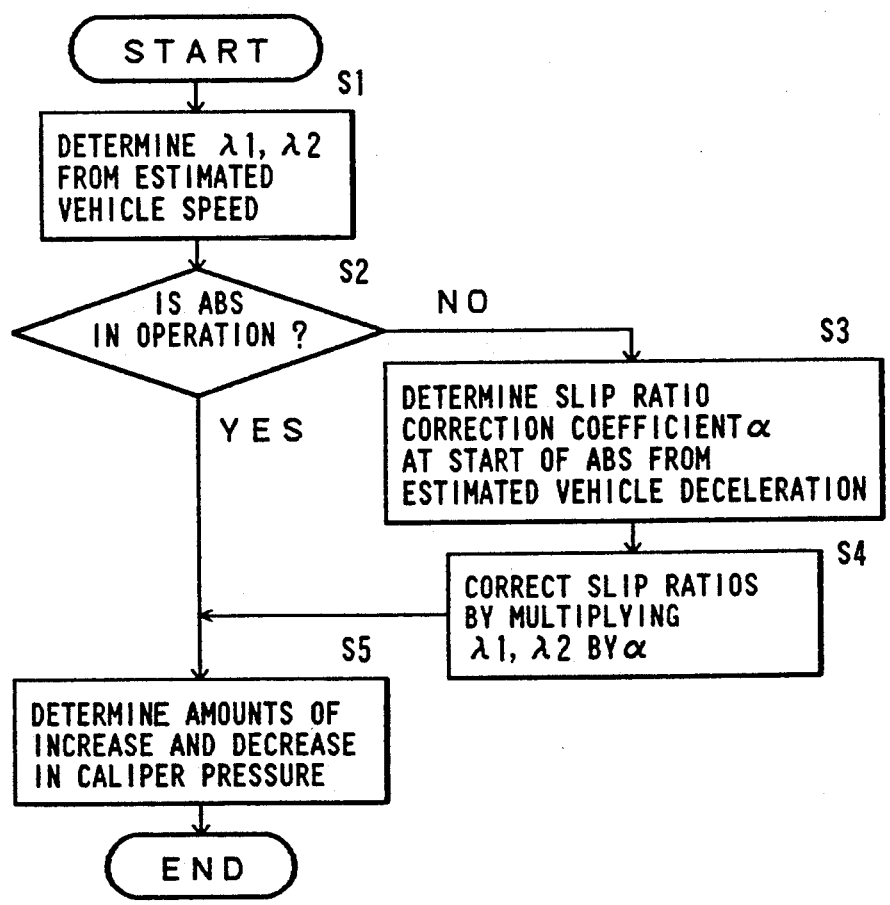
FIG. 4 is a flowchart for describing a procedure for correcting a slip ratio.
Figure 5:
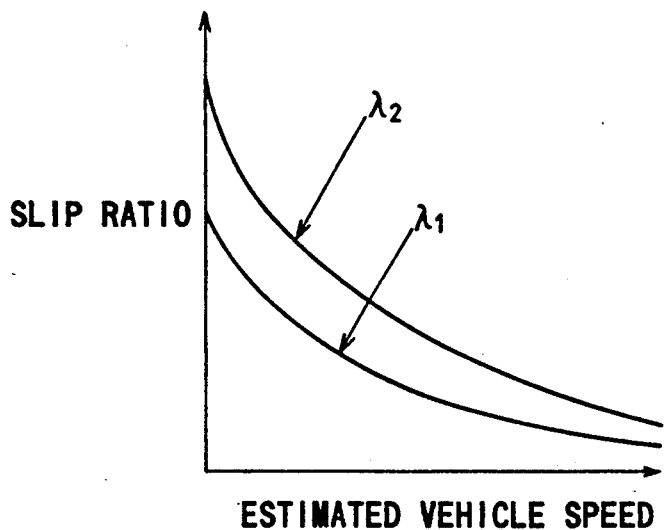
FIG. 5 is a view for describing the relationship between a slip ratio and a vehicle speed.

That is, a procedure for performing the operation of the amount-of-increase/decrease-in-caliper-pressure determining circuit 90 will be described with reference to a flowchart shown in FIG. 4. First of all, target slip ratios $\lambda 1$, $\lambda 2$ at the start of antilock control are determined based on the vehicle running speed estimated by the vehicle speed computing circuit 82 (Step S1). The target slip ratios $\lambda 1$, $\lambda 2$ represent the lower and upper limit values, respectively, of the slip ratio. These slip ratios $\lambda 1$, $\lambda 2$ vary depending on a change in the vehicle speed as illustrated in FIG. 5. When the wheel acceleration and deceleration and the target slip ratios $\lambda 1$, $\lambda 2$ are determined, the amounts of increase and decrease in the caliper pressure are decided from a Table shown in FIG. 6.

Figure 6:
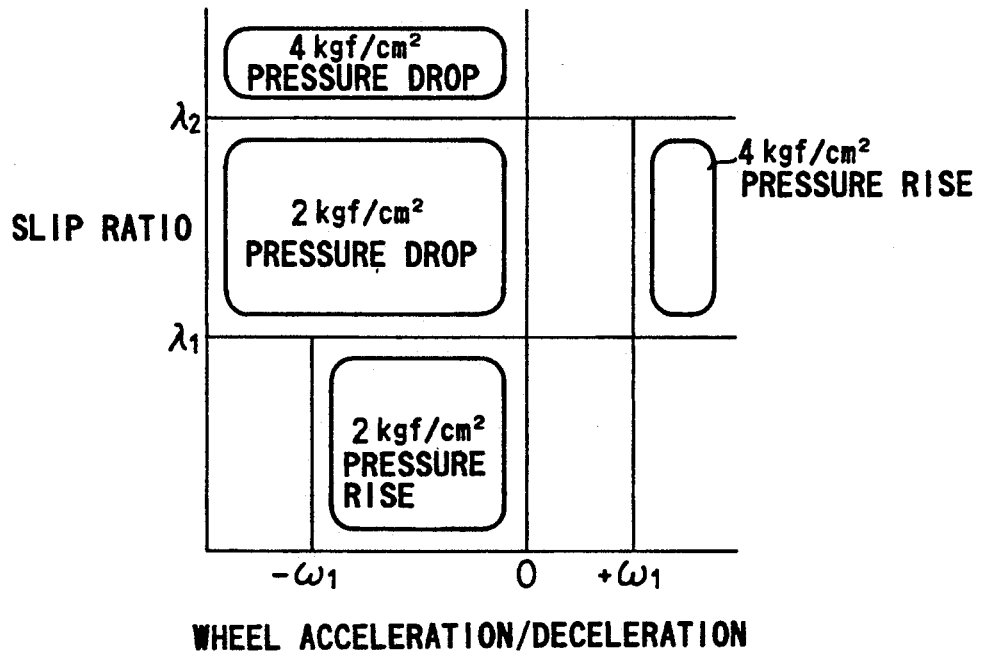
FIG. 6 is a view illustrating a table for determining the amounts of increase and decrease in caliper pressure.
Figure 7:
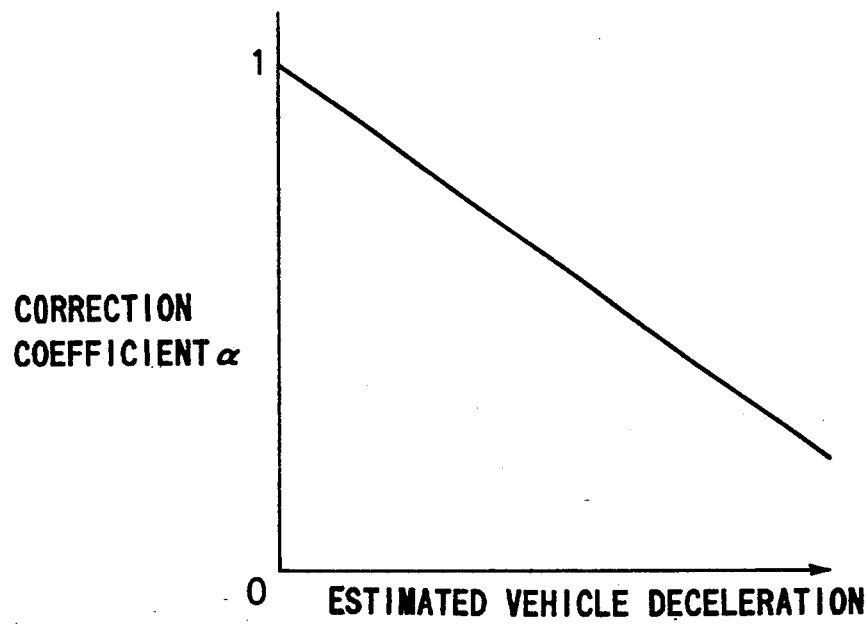
FIG. 7 is a view for describing the relationship between a slip ratio correction coefficient and a vehicle deceleration.

It is then determined whether or not the antilock control is being made (ABS is in operation)(Step S2). If the answer is determined to be No (in Step S2), then a slip ratio correction coefficient α at the start of the antilock control is determined (Step S3). At this time, the slip ratio correction coefficient α is reduced with an increase in the vehicle deceleration as shown in FIG. 7. A predetermined slip ratio correction coefficient α is determined based on the vehicle deceleration which has been computed by the vehicle deceleration computing circuit 88. Then, the target slip ratios λ1, λ2 are corrected by multiplying the previously-decided target slip ratios λ1, λ2 by the predetermined slip ratio correction coefficient α (Step S4). Accordingly, the target slip ratios λ1, λ2 shown in Table of FIG. 6 are corrected, so that the amounts of increase and decrease in the caliper pressure are determined from the Table (Step S5). Incidentally, the computing process may be carried out by the amount-of-increase/decrease-in-caliper-pressure determining circuit 90.

Figure 8:
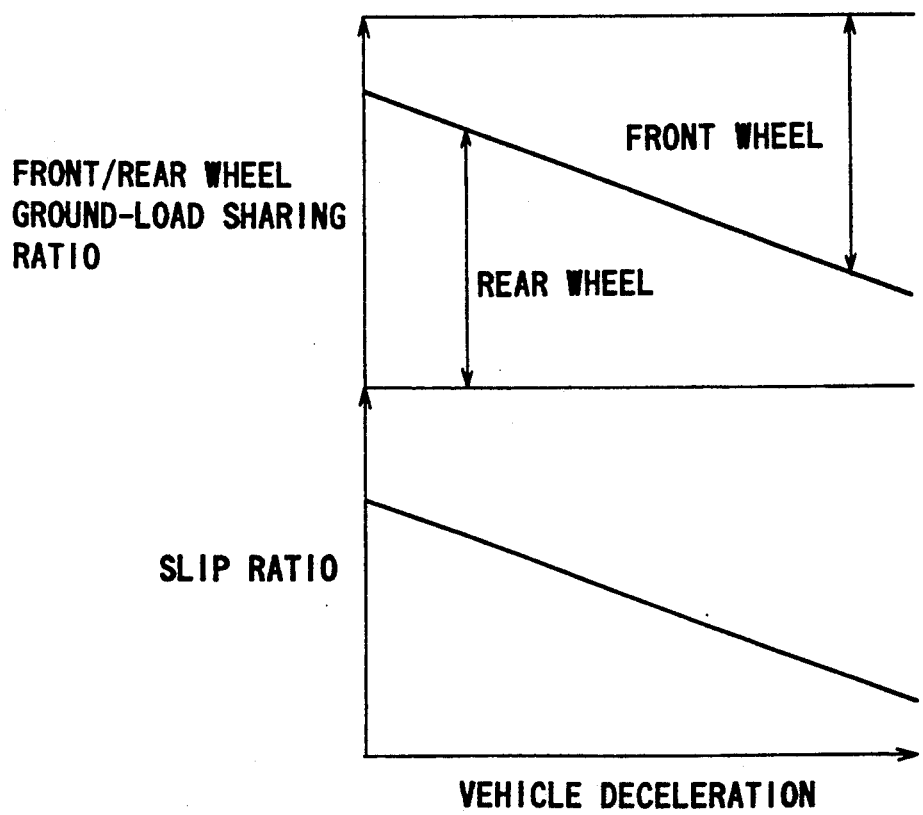
FIG. 8 is a view for describing the relationship between a slip ratio, a vehicle deceleration and a ground-load sharing ratio of each of front and rear wheels.

In the present embodiment, the slip ratio correction coefficient α is determined based on the vehicle deceleration. However, the vehicle deceleration is correlated to a front/rear wheel ground-load sharing ratio as illustrated in FIG. 8. Thus, the slip ratio correction coefficient α can be substantially treated equally as being determined depending on a variation in the front/rear wheel ground-load sharing ratio. Accordingly, a width corresponding to a variation in the front/rear wheel ground-load sharing ratio at the time that the antilock control is being made can be reduced as small as possible, thereby making it possible to improve vehicle controllability.

Next, the extent-of-increase/decrease-in-crank-angle determining circuit 92 determines a crank's displacement based on the previously-determined amounts of increase and decrease in the caliper pressure and outputs it to the motor controller 70. On the other hand, the potentiometer 38 reads information about an angle displaced from the upper limit position of the crank pin 34 and outputs it to the crank angle computing circuit 96 via the A/D converting circuit 94. Then, the crank angle computing circuit 96 outputs a control crank angle to the motor controller 70, i.e., the duty determining circuit 98 as data. Further, the duty determining circuit 98 determines the duty of the pulse based on the control crank angle. Thereafter, the train of pulse-width modulated pulse generated from the PWM circuit 100 in accordance with the determined duty are inputted to the motor driver 102.

The motor driver 102 is activated in response to the train of pulse-width modulated pulses to energize the d.c. motor 24, thereby displacing the crank pin 34 to the position of the control crank angle. That is, the pinion 26 mounted onto an unillustrated rotatable shaft is rotated under the action of rotation of the d.c. motor 24 to turn both the gear 28 held in meshing engagement with the pinion 26 and the crank arm 32 fixed to the gear 28 via the crank shaft 30, thereby displacing the crank pin 34 mounted to the crank arm 32 from the upper limit position to the lower limit position. Thus, the cam bearing 40 is lowered under the displacement action of the crank pin 34, so that the brake hydraulic pressure which acts on the expander piston 46 is added to the torque of the d.c. motor 24. Therefore, the expander piston 46 is pressed against the cam bearing 40 so as to be promptly lowered.

When the expander piston 46 is lowered a predetermined amount, the cut valve 48 is seated to thereby block or cut off communication between the input port 52 and the output port 58. Thus, when the expander piston 46 is further lowered singly, the volume on the output port 58 side increases so as to decrease the hydraulic pressure applied to the caliper cylinder 62, thereby reducing a braking force to be applied to the front wheel 16, for example. By doing so, desired antilock control can be effected.

The method of and the system for controlling the brakes, according to the present invention can bring about the following advantageous effects.

A vehicle deceleration prior to the start of antilock control is detected. Then, a target slip ratio at the start of the antilock control is corrected based on the detected vehicle deceleration. Therefore, vehicle controllability correlated to the vehicle deceleration can be securely prevented from being impaired. It is thus possible to reliably improve the control performance of the vehicle and to effect the optimum brake control.

Having now fully described the invention, it will be apparent to those skilled in the art that many changes and modifications can be made without departing from the spirit or scope of the invention as set forth herein.

What is claimed is:

1. A method of controlling brakes of a vehicle comprising the steps of:
   detecting respective rotational speeds of at least two wheels of the vehicle;
   determining a vehicle running speed of said vehicle from said rotational speeds;
   calculating target slip ratios of said at least two wheels from said vehicle running speed;
   detecting a vehicle deceleration of said vehicle before initiating said antilock control;
   determining a correction coefficient based on said vehicle deceleration;
   correcting said target slip ratios by multiplying said target slip ratios by said correction coefficient; and
   initiating said antilock control to control the brakes of said vehicle using the corrected target slip ratios.

2. The method according to claim 1, wherein said correction coefficient decreases in inverse proportion to an increase in the detected vehicle deceleration.

3. The method according to claim 1, further comprising the steps of:
   determining whether said antilock control has already been initiated after the step of calculating said target slip ratios; and
   detecting the vehicle deceleration only if said antilock control has not been initiated.

4. A system for controlling brakes in a vehicle, comprising:
   at least two wheel speed sensors for detecting a speed of at least two respective wheels of the vehicle;
   rotational speed computing circuit connected to said wheel speed sensors for computing a rotational speed of each of said respective wheels based on outputs from said at least two wheel speed sensors;
   vehicle speed computing circuit connected to said rotational speed computing circuit for computing a vehicle running speed of said vehicle from said rotational speed of each of said respective wheels;
   slip ratio computing circuit connected to said vehicle speed computing circuit for computing a target slip ratio of each of said respective wheels from said vehicle running speed and said rotational speed;
   vehicle deceleration computing circuit connected to said vehicle speed computing circuit for computing a vehicle deceleration from said vehicle running speed; and means for determining a caliper pressure to be applied to the brakes of said vehicle, including an arithmetic processing circuit for determining a correction coefficient for correcting said target slip ratio based on said computer vehicle deceleration and for correcting said target slip ratio by multiplying said target slip ratio by said correction coefficient.

* * * * *